United States Patent [19]

McAllister

[11] Patent Number: 5,590,935
[45] Date of Patent: Jan. 7, 1997

[54] IN-LINE SKATE WHEEL COVER

[76] Inventor: Michael J. McAllister, 1504 Arbor Town Cir., #1117, Arlington, Tex. 76011

[21] Appl. No.: 536,260

[22] Filed: Sep. 29, 1995

[51] Int. Cl.⁶ ..................................................... B60B 7/01
[52] U.S. Cl. ........................ 301/37.1; 301/5.3; 301/37.43
[58] Field of Search ............................... 301/37.1, 37.42, 301/37.43, 5.3, 5.7; 280/11.22, 11.23

[56] References Cited

U.S. PATENT DOCUMENTS

| | | | |
|---|---|---|---|
| 2,022,348 | 11/1935 | Hoerle | 301/5.7 |
| 2,221,553 | 11/1940 | Okun | 301/5.7 X |
| 2,392,633 | 1/1946 | Bierman | 301/5.7 |
| 2,517,322 | 8/1950 | Kahle | 280/11.23 X |
| 3,883,180 | 5/1975 | Kain . | |
| 4,408,803 | 10/1983 | Green et al. . | |
| 4,511,182 | 4/1985 | Birnbaum . | |
| 5,290,065 | 3/1994 | Kassal . | |
| 5,372,383 | 12/1994 | Kubierschky | 280/11.23 X |

*Primary Examiner*—Russell D. Stormer
*Attorney, Agent, or Firm*—Laubscher & Laubscher

[57] ABSTRACT

A protective cover for a wheel of an in-line skate is characterized by a circular discoid element having an outer diameter corresponding with the outer diameter of a sidewall surface of the wheel and containing a central opening having a diameter corresponding with the diameter of the axle of the wheel. A layer of adhesive is applied to the surface of the element facing the wheel to connect the discoid element with the wheel sidewall surface. The element protects the wheel bearings from contaminants, thereby extending the life of the wheel bearings.

6 Claims, 1 Drawing Sheet

IN-LINE SKATE WHEEL COVER

BACKGROUND OF THE INVENTION

In-line skating provides exercise and has become a popular form of recreation. Like roller-skating, in-line skating is accomplished by a skater gliding on small wheels, attached to his or her boots. The activity is very similar to that of conventional roller skating. However, unlike conventional roller skates, the base of each in-line skate has a single set of wheels in a frame, that are set "in-line," one wheel behind another, extending from heel to toe.

The in-line skate design, including its significant use of lightweight thermoplastic materials, is intended to provide a more effortless glide and greater maneuverability than that found with ordinary roller skates. For smooth operation, both rely upon lubricated, precision ball bearings, but the design of conventional roller skates permits the use of wheel caps. These caps or covers are credited with helping to prevent the contamination of the roller skates' wheel bearings. In-line skates are of a basic design that cannot make use of hub caps or wheels caps designed for roller skates.

It is recognized that the life of most exercise equipment can be extended, if it is properly used and maintained; in-line skates are no exception. The in-line skate merely needs to be kept clean and the skate's straps or laces in good working condition. However,. to be able to continue to enjoy the characteristically smooth glide and maneuverability of in-line skates, the wheels must be regularly rotated and the most critical maintenance requirement attended to: lubrication of the expensive wheel ball bearings.

Typically, one of a pair of in-line skates exhibits three wheels for children, three to four wheels for recreational users, the vast majority of skaters, and five wheels for racing skaters. Most skaters try to avoid contaminating the lubrication of the wheels with dust and dirt, but it presents a constant challenge. As the in-line skates are used, the wheel bearings are continuously exposed to contamination from common dust and dirt. Some of the contamination comes from the road, sidewalk or other skating surface, and a portion of the dust is generated by the abrading thermoplastic wheels.

It is probable that the insulative nature of the heavily thermoplastic composition of the in-line skates also contributes to a buildup on the wheels of the dust and dirt contamination. As the wheels rotate at high speeds, they generate friction, accumulating a triboelectric static charge that attracts dust and dirt to the sensitive bearing mechanisms. However the contamination finds its way onto the wheels, it deteriorates the lubricant used in the wheel bearings, causing early lubricant failure and overheating. This excessive heat can distort bearing parts and destroy them. Even a small amount of lubricant contamination can significantly hinder wheel spin and impede the skater.

The present invention is directed toward preventive maintenance that protects the wheel core and bearings from the accumulation of dust and dirt. This protection prolongs the life of the wheel bearings and substantially eliminates the tedious chore of cleaning each wheel and wheel bearing component.

Each in-line skate wheel has a solid, medium-to-high durometer, elastomeric outer wheel, whose running surface is designed to endure high impact and rough contact with the ground or other skating surface. The wheels are generally formed with a hub or core made of metal, rigid thermoplastic or plastic composite material that supports the outer wheel. The outer wheel and core are permanently affixed to each other by various processes, such as Plasma Ionization Bonding and Covalent Bonding. The in-line skate wheel core is molded in a variety of styles, each having a single central hole of the precise diameter that accommodates two sets of standard wheel ball bearing casings.

A wheel-retaining, elongated channel, running parallel with the longitudinal form of the base of the in-line skate, provides a rigid frame for the attachment of in-line wheels by way of an axle. This rigid frame covers more than half of the sidewalls of each wheel so that an axle can penetrate a small hole at a position along the outside, longitudinal half of the in-line frame, and pass through the outside ball bearing casing, into and through a spacer and through the inside ball bearing casing and the small hole in the inside, longitudinal half of the frame. The axle is capped and secured on both of its ends by various means.

The ball bearing casings surrounding each axle are primarily manufactured of chrome alloy or stainless steel parts. The bearing casings positioned within the outer side of each wheel's core and the other within the inner side of the core are separated by a hollow, plastic or metal "spacer." For proper wheel rotation, the casings must be kept free of dust and dirt and properly lubricated. A pair of in-line skates has sixteen wheel bearings and to clean them, each mechanism must be carefully disassembled. As the bearing mechanisms are each comprised of approximately fourteen very small parts, they are not easily put back together. However, with some simple tools, patience and a steady hand, reassembly can be accomplished.

The present invention provides a simple in-line skate wheel cover that can be readily affixed to the sidewalls of each in-line skate wheel to shield and protect its core and sensitive ball bearing mechanisms from dust and dirt. Use of such in-line skate wheel covers helps prevent lubricant contamination and failure, prolonging the useful life of the expensive wheel bearings. When the wheel covers are in place, the need to regularly dismantle the wheels and wheel bearings mechanisms to clean the intricate components therein is substantially eliminated.

BRIEF DESCRIPTION OF THE PRIOR ART

The advent of conventional roller skates pre-dates the "in-line" skate and as both forms of skates rely upon ball bearings, both varieties of skates are exposed to, and damaged by, dust and dirt. The prior art exhibits several wheel coverings by which the ball bearings of roller skates can be protected. Various wheel adaptations exist, such as those taught by Birnbaum in U.S. Pat. No. 5,290,065 and Green et al in U.S. Pat. No. 4,408,803.

However, conventional roller skates have a basic, inherent design that is significantly different from that of in-line skates. Thus, the wheel hub cap for roller skate wheels disclosed in the Kain U.S. Pat. No. 3,883,180 and those disclosed in the two aforementioned patents simply do not fit an in-line skate wheel.

The rigid frame, which retains the wheels in the elongated channel of the in-line skate, covers more than half of the surface of the wheel sidewalls, so a cap or cover of the kind represented in the prior art is not practical for the wheels on in-line skates. The clearance between the sidewalls of the wheels and the respective inside edge of the rigid frame is generally less than one and one-half millimeters, much too narrow to permit the use of a hub cap or conventional wheel cover described in the prior art.

Other prior art, such as the Kassal U.S. Pat. No. 5,290,065, pertains to in-line skates, but does not present a "wheel cover" for individual wheels. Rather, Kassal discloses a covering for the entire bottom portion of the in-line skate that would immobilize the wheels, allowing a skater to walk safely in the skates, when not skating.

SUMMARY OF THE INVENTION

Accordingly, it is a primary object of the present invention to provide an inexpensive, water and grease resistant, discoid element of precise dimensions containing a hole through its center and exhibiting on one of its sides a water and grease resistant adhesive. This adhesive allows a seal between the discoid element and a side of an in-line skate wheel, where it is semi-permanently affixed. The discoid element is an inexpensive wheel cover shielding and protecting the core and sensitive ball bearing mechanism of the wheel. Using two wheel covers per wheel prolongs the life of the expensive wheel bearings, easily allowing the in-line skater to substantially reduce the exposure of the expensive wheel ball bearing mechanisms to damaging dust and dirt. This protection prolongs the life of the ball bearings and nearly eliminates the regular chore of dismantling and cleaning each wheel and the intricate wheel bearings component.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
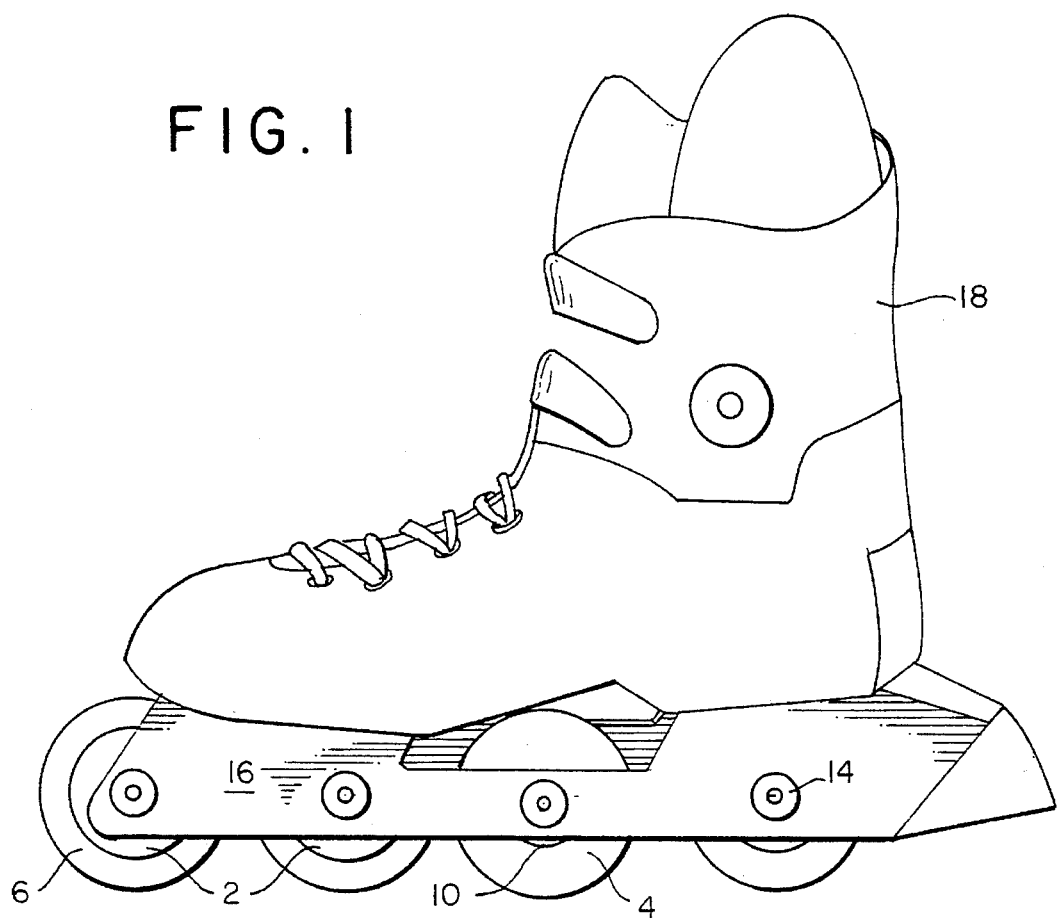
FIG. 1 is a side plan view of a typical in-line skate with the wheel covers in place on the sidewall of two of the in-line skate wheels.
Figure 2:
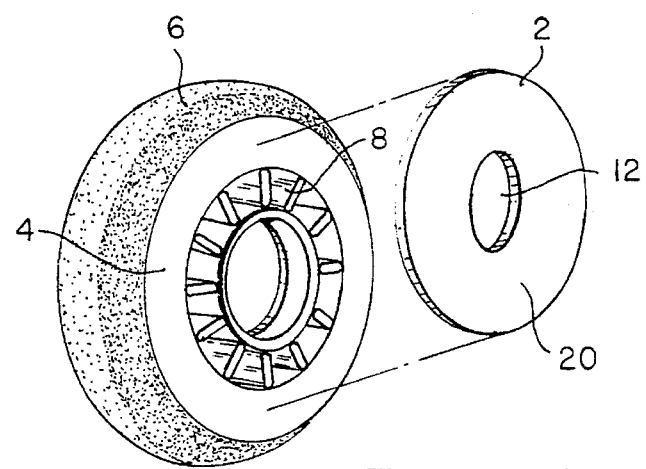
FIG. 2 is an enlarged, perspective view of a wheel cover element of the present invention, positioned aside an in-line skate wheel, prior to is application to the sidewall surface of the wheel.

Referring to FIGS. 1 and 2 of the drawings, the present invention relates to a discoid element employed as a wheel cover 2 designed to be applied to each flat and circumferential sidewall surface 4 of an in-line skate wheel 6, thereby covering the entire rigid wheel core 8 or hub of the in-line skate wheel 6 and the ball bearing casing 10. The wheel cover element may be manufactured in various diameter sizes that range from approximately one and one-quarter to six centimeters to properly fit and cover the side of variety of sizes of in-line skate wheels 6. It is preferred to form the wheel cover element 2 to be as thin as practicable to prevent its presence on the sidewall surface 4 of the wheel from impeding the free rotation of the in-line skate wheel 6. The measured thickness of the wheel cover element 2 may range from less than two one-hundredths of a millimeter to one and one-half millimeters.

The wheel cover element 2 contains a circular hole 12 in the center of its diameter formed by die-cutting, drilling or other accepted industry practice to accommodate the cylindrical wheel axle 14 that attaches the in-line skate wheel 6 to the wheel-retaining, elongated, rigid frame 16 of the in-line skate 18 shown in FIG. 1. The hole 12 has a diameter that ranges in size from six to thirteen millimeters and must not be too small, to avoid interfering with the free rotation of the in-line skate wheel 6 about its axis.

The wheel cover element 2 is formed of a discoid nonporous, corrosion-resistant, synthetic plastic or treated, paper-based material, or of a laminate or a coated or surface-treated construction of these and other materials. A water-resistant and grease resistant adhesive, pre-applied to one of the two flat surfaces of the discoid wheel cover element 2, gives the wheel cover element 2 an adhesive surface 20, which will make intimate contact with, and become semi-permanently affixed to, the flat and circumferential sidewall surface 4 of an in-line skate wheel 6 and/or the rigid wheel core 8 or hub of the in-line skate wheel 6.

When the wheel cover element 2 is properly applied to the in-line skate 6, it shields and protects the rigid wheel core 8 and sensitive mechanism of the ball bearing casing 10 from exposure to lubricant-contaminating dust and dirt. This shield substantially eliminates the regular chore of cleaning the rigid wheel core 8 and ball bearing casing 10.

For aesthetic purposes, the non-adhesive surface of the wheel cover element 2 may be colored, printed, embossed or otherwise decorated, but it is preferred that it present a smooth exterior surface to avoid interfering with the spin of the in-line skate wheel 6.

While in accordance with the provisions of the patent statute, the preferred forms and embodiments having been illustrated and described, it will be apparent to those of ordinary skill in the art that various changes and modifications may be made without deviating from the inventive concepts set forth above.

What is claimed is:

1. Apparatus for protecting a ball bearing casing of an in-line skate wheel, comprising
   (a) a thin planar discoid element having inner and outer surfaces and an outer diameter corresponding with at least the outer diameter of the ball bearing casing and containing a central opening having a diameter at least as great as the diameter of an axle of the wheel; and
   (b) means for connecting said discoid element inner surface in sealing relation with a side of the wheel in superimposed relation over the ball bearing casing, whereby said discoid element rotates with the wheel and covers the ball bearing casing to prevent contaminants from contacting the wheel bearings.

2. Apparatus as defined in claim 1, wherein said connecting means comprises a layer of water and grease resistant adhesive arranged between a surface of said discoid element and the wheel.

3. Apparatus as defined in claim 2, wherein said discoid element is formed of a light-weight synthetic plastic material.

4. Apparatus as defined in claim 2, wherein said discoid element is formed of a laminate of cellulose and synthetic plastic materials.

5. Apparatus as defined in claim 2, wherein said discoid element has a thickness of between 0.02 and 1.5 millimeters, whereby said element will not interfere with a frame of the in-line skate.

6. Apparatus as defined in claim 5, wherein the outer diameter of said discoid element corresponds with the outer diameter of a planar sidewall surface of the wheel.

\* \* \* \* \*